United States Patent
Wong et al.

(10) Patent No.: US 9,773,045 B2
(45) Date of Patent: *Sep. 26, 2017

(54) PROVIDING OBJECTIVE AND PEOPLE RESULTS FOR SEARCH

(71) Applicant: Microsoft Technology Licensing, LLC, Redmond, WA (US)

(72) Inventors: Sandy Wong, Seattle, WA (US); Wei Mu, Redwood City, CA (US); Jun Yin, Bellevue, WA (US); Rahul Nair, Daly City, CA (US); Simon King, Berkeley, CA (US); Srinivasan Badrinarayanan, Redmond, WA (US); Xavier Legros, Woodside, CA (US); Michael Ching, San Jose, CA (US); Kevin Haas, Los Gatos, CA (US); Shubha Nabar, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/029,581

(22) Filed: Sep. 17, 2013

(65) Prior Publication Data

US 2014/0181101 A1 Jun. 26, 2014

Related U.S. Application Data

(63) Continuation of application No. 13/204,631, filed on Aug. 5, 2011, now Pat. No. 8,538,960.

(51) Int. Cl.
*G06F 17/30* (2006.01)

(52) U.S. Cl.
CPC .... *G06F 17/3053* (2013.01); *G06F 17/30861* (2013.01); *G06F 17/30867* (2013.01)

(58) Field of Classification Search
USPC .......... 707/5; 705/39; 715/751; 726/26; 709/204–206
See application file for complete search history.

(56) References Cited

U.S. PATENT DOCUMENTS 7,788,260 B2    8/2010  Lunt et al.
8,015,615 B1 *  9/2011  Agrawal et al. ......... 726/26
(Continued)

OTHER PUBLICATIONS

Jiang, Tingting, "Characterizing and Evaluating Users' Information Seeking Behavior in Social Tagging Systems", Retrieved at <<http://etd.library.pitLedu/Etd/available/etd-12172010-145557/unrestricted/Jiang_Tingting_etd2010. pdf>>, Dec. 8, 2010, 188 pages.

(Continued)

*Primary Examiner* — Etienne Leroux
(74) *Attorney, Agent, or Firm* — Dave Ream; Tom Wong; Micky Minhas

(57) ABSTRACT

Search results may include both objective results and person results. In one example, a search query is evaluated to determine whether it is the type of query that a user might want to ask to a friend. If the query is of such a type, then the search engine may examine a social graph to determine which friends of the user who entered the query may have information that is relevant to answering the query. If such friends exist, then the friends may be displayed along with objective search results, along with an explanation of each friend's relevance to the query. Clicking on a person in the results may cause a conversation to be initiated with that person, thereby allowing the user who entered the query to ask his or her friend about the subject of the query.

20 Claims, 4 Drawing Sheets

(56) References Cited

U.S. PATENT DOCUMENTS

| | | | |
|---|---|---|---|
| 8,326,751 B2* | 12/2012 | Driemeyer et al. | 705/39 |
| 2007/0245245 A1 | 10/2007 | Blue et al. | |
| 2007/0250585 A1 | 10/2007 | Ly et al. | |
| 2007/0271232 A1 | 11/2007 | Mattox et al. | |
| 2008/0005072 A1 | 1/2008 | Meek et al. | |
| 2008/0243819 A1* | 10/2008 | Sareen et al. | 707/5 |
| 2009/0024615 A1* | 1/2009 | Pedro et al. | 707/5 |
| 2009/0187537 A1 | 7/2009 | Yachin et al. | |
| 2009/0307205 A1 | 12/2009 | Churchill et al. | |
| 2010/0132049 A1 | 5/2010 | Vernal et al. | |
| 2010/0138491 A1 | 6/2010 | Churchill et al. | |
| 2011/0055207 A1 | 3/2011 | Schorzman et al. | |
| 2011/0087661 A1 | 4/2011 | Quick et al. | |
| 2012/0209832 A1 | 8/2012 | Neystadt et al. | |
| 2012/0209908 A1* | 8/2012 | Angelos et al. | 709/204 |
| 2012/0209920 A1 | 8/2012 | Neystadt et al. | |
| 2012/0210247 A1* | 8/2012 | Khouri et al. | 715/751 |
| 2012/0323991 A1 | 12/2012 | Wang et al. | |

OTHER PUBLICATIONS

Aigchtein, et al., "The Social Future of Web Search: Modeling, Exploiting, and Searching Collaboratively Generated Content", Retrieved at <<http://sites.computer.org/debull/A09June/agichtein_ssm1.pdf>>, Bulletin of the IEEE Computer Society Technical Committee on Data Engineering, Jun. 2009, 10 pages.

Mislove, et al., "Exploiting Social Networks for Internet Search", Retrieved at http://www.mpi-sws.org/~amislove/ publications/ PeerSpective-HotNets.pdf>>, Nov. 2006, pp. 1-6.

"Search Report and Written Opinion of the International Searching Authority," PCT/US2012/049073, mailed on Jan. 31, 2013, 9 pages.

\* cited by examiner

PROVIDING OBJECTIVE AND PEOPLE RESULTS FOR SEARCH

CROSS-REFERENCE

This is a continuation of U.S. patent application Ser. No. 13/204,631, entitled "Providing Objective and People Results for Search", filed Aug. 5, 2011, now U.S. Pat. No. 8,538,960.

BACKGROUND

Search engines are used to find answers to various types of information problems. Traditionally, search engines are used to identify documents that relate to a query. However, search engines can provide various other types of information. For example, search engines can provide up-to-date weather reports, availability or pricing of airline tickets, current prices for retail goods, or various other type of information. What these types of problems have in common is that the search engine is answering queries that call for objective information that can be marshaled from available data sources.

However, there are some types of queries that are not entirely amenable to objective answers. For example, if a person is asking for a good restaurant in Berkeley, Calif., there may be relevant information that is not objectively discernible from Internet documents. There are professional and amateur restaurant reviews; a search engine can locate these reviews, and the reviews might be of interest to the searcher. However, a searcher who is looking for a restaurant might be interested in more that the opinions of professional reviewers, or the opinions of diners whom the searcher does not know. In general, there is a class of queries that cannot be satisfactorily answered—or that can be only partially answered—by the kind of objective information that that search engines are adept at locating.

SUMMARY

In some cases, a relevant answer to a search query is the identity of a person who can help the searcher to answer a question. Thus, identities of people who can answer a query may be included in search results.

When a user enters a search query, the search engine determines whether the nature of the query is such that it can be answered by wholly objective search results. If the query is of such a nature, then objective results (e.g., Uniform Resource Locators of documents, flight schedules, weather reports, etc.) may be provided in response to the query. However, if the query is such that one might want to ask specific people for answers, then the search engine further attempts to identify people who can provide those answers. If people who are relevant to finding the answer are known to the search engine, then those people may be included in the search results, along with an optional, brief statement indicating why a particular person is relevant to the user's query. If people are included in the search results, then the user may be given the opportunity to initiate a conversation with that person in order to ask a question.

For example, if a person enters the query "good restaurant in Berkeley, California", the search engine may determine that the query is seeking subjective information. (This determination might be made based on the use of the subjective word "good" in the query, but the determination could also be made in other ways.) In addition to providing objective-information-type results to the query, the search engine may then attempt to find people who would have information relevant to the person's question. In one example, people are selected based on having a pre-existing relationship with the user who is asking the question (e.g., being a "friend" of the user), and also based on having some attribute of relevance to the query. For example, the people selected might be friends of the user who have lived in Berkeley, worked in Berkeley, attended the University of California at Berkeley, etc.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
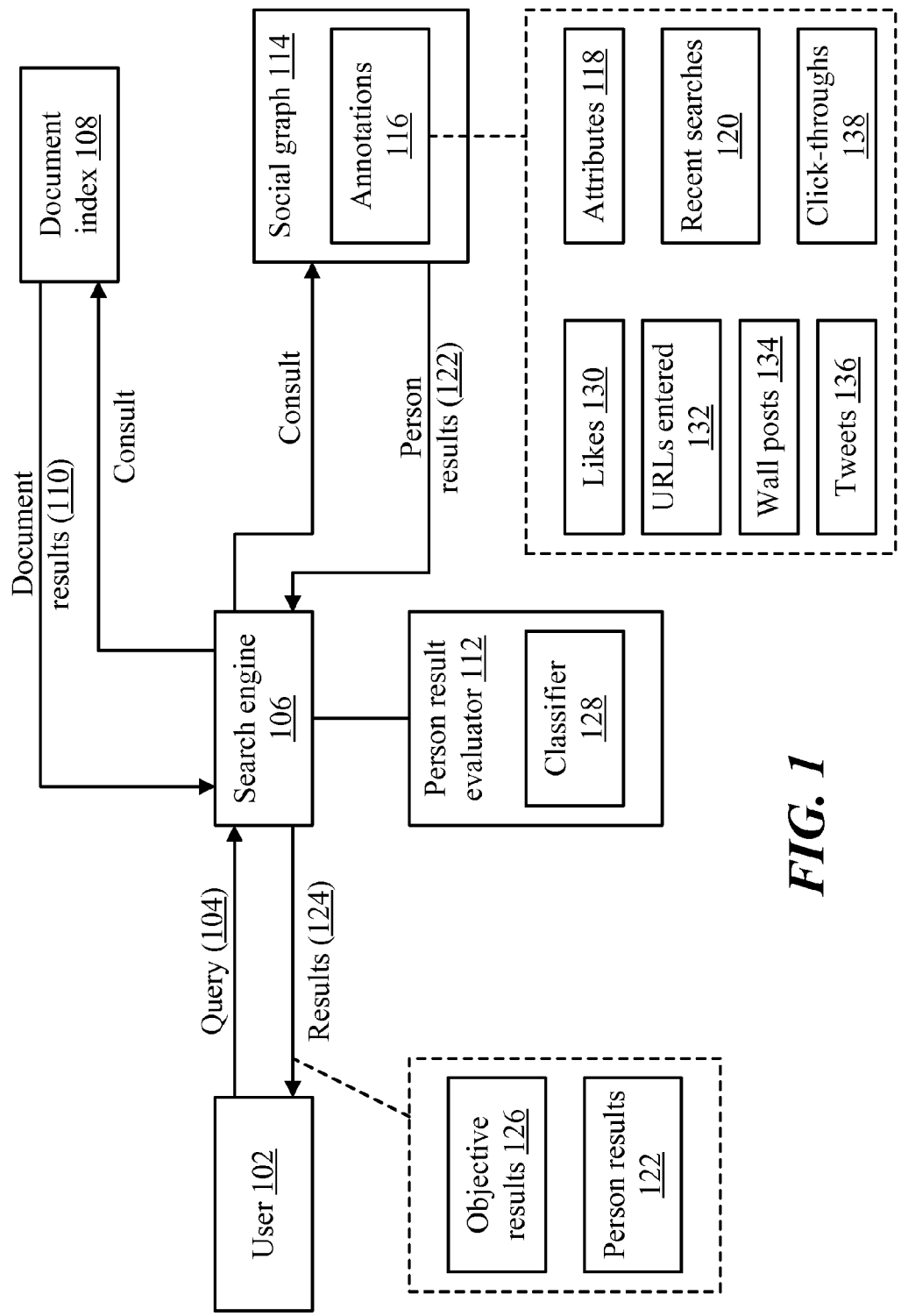
FIG. 1 is a block diagram of an example system in which a query may be answered with objective results and/or person results.

Search engines are typically used to find objective information. One example of finding objective information is identifying documents that relate to a text query. However, many search engines can provide other types of objective information—e.g., current weather reports, flight schedules, answers to math problems, prices of retail products, stock quotes, populations of countries, etc. When objective information that answers a query is available, the search engine can simply provide that information to the user who entered the query.

However, some types of queries are not readily amenable (or are only partially amenable) to objective answers. If a user asks for the "next flight from San Francisco to Seattle", this query is an objective question that can be answered based on airline flight data. But if the user asks "what is the best airline", or "what to see in Seattle", the answer is not wholly objective. There are professional and user-supplied reviews of airlines, and there are tourist travel guides for major cities such as Seattle; such reviews and guides are certainly relevant to the user's query. But the user might be interested in more than general guidance on tourist destinations in Seattle, or professional reviews of airlines. Rather, the user might want to know what people with knowledge of these topics think—particularly those people with whom the user has a social connection. When the user's query is "what is the best airline" or "what to see in Seattle", the Condé Nast airline reviews and Fodor's Seattle Travel Guide are relevant query results. But "Joe flies every week" or "Steve went to school in Seattle" might also be relevant results.

The subject matter described herein allows objective search results to be augmented with the identities of people who may be able to help answer a query. The people who are included in the search results may be "friends" of the user who submits the query, and may be identified as friends using a social graph. In this way, the people who appear in the search results may be people who are known to the user who entered the query. When a person appears in the search results, clicking on that user may result in initiating a conversation with that person—e.g., via e-mail, telephone, instant messaging (IM), or the chat mechanism provided by a social network.

When a user enters a query into a search engine, the search engine evaluates the query to determine whether the nature of the query is such that asking a person might help to answer the question. In general, the decision may be based on whether the query asks for wholly objective information, or asks for information that may have a subjective component. For example, if the user is asking for a list of flights from one city to another, the information requested is wholly objective; this type of information can be gleaned from airline databases. On the other hand, if the user is asking for restaurant recommendations, the answer the user is seeking has a subjective component, since the user is effectively asking for a person's opinion about what restaurant he or she likes. Where the user is asking for an opinion, the user might place more stock in the opinions of people the user knows— particularly those people who have some connection to the question. If the user is asking for a restaurant recommendation in Berkeley, the user might find it interesting to know where his or her friends like to eat—even more so if those friends have lived in Berkeley.

If the nature of the query is such that asking a person would be a helpful way to answer the query, the search engine may include a list of people in the search results. A list of people might not be a complete substitute for objective results—e.g., with the query "restaurant in Berkeley," a search engine might still generate objective results such as restaurant review web sites, or the web sites of specific restaurants. However, the search engine may add a list of people to the results. The people may be selected based on their connection to the query, and also based on the social graph that shows each person's relationship to other people. A person might be particularly trusting of the opinions of his or her friends (or of people who have some defined, but more attenuated, relationship to the user, such as being a friend of a friend). Therefore, the people who are shown in the search results may be those who have some relationship to the user, and who also have some attribute that makes them relevant to the query. In the case of the query "restaurant in Berkeley", the concept of people being "relevant to the query" might include those people who have lived or worked in Berkeley, or who have attended school in Berkeley. Any such people who are in the user's social circle could be shown to the user as part of the search results.

When the option exists to include people in the search results, one issue that arises is identifying the type of queries for which this type of result is appropriate. In one example, queries that explicitly call for subjective information could be chosen to include people in the results. Thus, queries whose terms are suggestive of opinions (e.g., "good", "best", "like", etc.) might be understood as calling for subjective answers. However, in some cases subjectivity is implied—e.g., "restaurant in Berkeley" might be understood as implicitly seeking an opinion about restaurants, even if the words in the query do not explicitly ask for one. In another example, identifying a query that seeks subjective information could be treated as a problem of training a classifier. Each time a user is shown people results in response to a query, a record can be made of whether the user chose one of the people results (e.g., by clicking on the person to indicate that the user wants to initiate a conversation with that person). In this sense, each instance in which a user is shown people results provides an example that can be used to train a classifier: the user's clicking on a person result turns the query that produced that result in to a positive example, and the user's not clicking on a person result turns the query into a negative example. In this way, a classifier can learn to recognize the types of queries for which users tend to think the people results are relevant.

It is noted that the subject matter herein differs from, and is not obvious in view of, systems that merely search for specific people by name or attribute. Unlike systems that are focused on searching for specific people, the subject matter described herein may evaluate a query to determine whether identifying a person is even an appropriate response to the query, and/or may present both people results and objective results in a single set of results.

Turning now to the drawings, FIG. 1 shows an example system in which a query may be answered with objective results and/or person results. User 102 may submit query 104 to search engine 106. Search engine 106 may be an Internet search engine that consults an index of objective information to produce results in response to a query. In one example, the index of objective results is document index 108, although various types of objective information other than documents could be indexed (e.g., flight schedules, city populations, dates of holidays, etc.). Search engine 106 may comprise logic to compare a query to the index of objective results. Search engine 106 may use techniques to compare the query to a corpus of information—e.g., search engine 106 might create a vector to represent the query, and might use a comparison technique (e.g., cosine similarity) to compare the vector representation of the query to a document index. Search engine 106 may also use techniques such as expanding terms in the query based on synonyms and/or word stems in order to produce more comprehensive results when the comparison is made.

Using some appropriate set of techniques, search engine 106 may generate objective results (such as document results 110) by using an objective body of information. However, in addition to obtaining objective results, search engine 106 may also attempt to find person results. Search engine 106 may comprise, or make use of, a person result evaluator 112, which evaluates a query to determine whether the query is appropriate for producing person results. For example, person result evaluator 112 may determine whether specific words in the query appear to call for subjective results, or may use a classifier 128 that has been trained in the manner described above to identify such queries. If the query is determined not to be appropriate for person results, then search engine 106 may provide, to user 102, objective results 126 without providing person results. However, if the query is determined to be appropriate for person results, then the search engine may consult social graph 114 to identify people to include the results.

Social graph 114 is a data structure that represents people's relationships to each other. For example, a social networking site such as Facebook may allow people to identify each other as friends, in which case each person is a vertex in the social graph and each friend relationship is a non-directed edge. In another example, a microblogging service such as Twitter may maintain a directed graph in which each person is a vertex and each "following" relationship is a directed edge from the follower to the followee. Any appropriate type of social graph may be used. In one example, a first company may maintain a robust social networking service that results in a comprehensive social graph, and a second company may maintain a relationship with the first company that allows the second company to access the social graph built by the first company. Regardless of the exact nature of the social graph 114 that is being used, social graph 114 allows search engine 106 to determine what people might be of interest to user 102 when responding to query 104.

Social graph 114 may maintain annotations 116, which describe the people in the social graph in various ways. In the example of FIG. 1, various example types of annotations are shown. One example type of annotation is attributes 118. Attributes 118 describe features of a person—e.g., the school the person went to, towns the person has lived in, places the person has worked, placed the person has traveled to, the person's interests, or any other appropriate type of information. Attributes 118 may be helpful in determining whether a particular person is relevant to answering a query—e.g., if the query is for "restaurant in Berkeley", a relevant person might be a friend of user 102 who has lived in Berkeley, or who lists the University of California at Berkeley as one of his schools.

Another type of annotation that may be relevant is recent searches 120. For example, if user 102 searches for "restaurant in Berkeley", he or she might be interested in talking to friends who have recently searched for the same thing (since those friends might have received recommendations from others, or might actually have followed the recommendation and have eaten at the recommended restaurant). Thus, social graph 114 may maintain a person's recent searches 120 as an annotation, and these recent searches may be helpful in determining which people to include in a set of results.

Other types of annotations include a person's declared affinities (such as likes 130—e.g., things or concepts for which the user has selected the "like" button or link), URLs 132 that the person has entered, posts 134 on a person's "wall", microblog entries such as tweets 136, and click-throughs 138 (e.g., situations where a person has clicked on an ad). Any of this information (or other types of information) could be used to determine whether a particular person in the social graph is relevant to a query.

The foregoing are some examples of annotations, although any appropriate type of annotation could be used.

Based on a comparison of query 104 to the information contained in social graph 114, search engine 106 may generate a set of person results 122. Person results 122 may be based on the proximity (or "closeness") of user 102's relationship to people in social graph 114, and also based on the relevance of a given person in social graph 114 to query 104. Thus, if query 104 is "restaurant in Berkeley" and user 102 has a friend (or a friend of a friend, or a person having some other relationship to user 102) who lived in Berkeley, then the friend may be one of person results 122. On the other hand, social graph 114 may contain many people who have lived in Berkeley but have no relationship to user 102, or who are friends of user 102 but have no connection to Berkeley; such people may or may not be used in person results 122. In one example the only people who appear in person results 122 are people who are friends of user 102 and who have a subject-matter connection to query 104.

In addition to (or as an alternative to) matching the query against basic facts in social graph 114, the query may also be matched against derived facts or inferences. In one example, characteristics of a user are derived from basic facts (e.g., a user might be inferred to have the characteristic "loves Stanford sports" based on the fact that the user has declared affinity for (e.g., "liked") several Stanford sports teams, and/or based conclusions drawn from text posts on the user's wall). The query may then be compared with this derived characteristic, rather than merely being compared with basic facts about the user. (In one example, the words in the query are compared with the derived characteristic, but not with basic facts in the social graph such as declared affinities (e.g., "likes") or wall posts.) In another example, locations that appear in a query, or that are associated with a person in the social graph, may be matched based on geographic distance rather than place name. For example, if a location is detected (either in the text of a query, or in a person's annotations in the social graph), the location may be converted to latitude and longitude coordinates, thereby allowing two locations to be matched if they meet a distance criterion (e.g., if the two locations are less than twenty miles apart). Thus, a query for "Cal Bears" might match a person who lives in Walnut Creek, Calif., since "Cal Bears" refers, indirectly, to the University of California at Berkeley (which is in the City of Berkeley), and Walnut Creek is a city that is near Berkeley. In yet another example, a concept graph may be built in order to allow query terms to be match to people based the concepts to which the query and the people's annotations relate. For example, a query for "electric car" might match a person who owns a Chevy Volt or Nissan Leaf, if the concept graph associates the terms "Chevy Volt" and "Nissan Leaf" with the concept "electric car." Similarly, a query for "Dune" might produce, as a result, a person who likes "Blade Runner", if the concept graph associates both "Dune" and "Blade Runner" with the concept 1980s science fiction movies. Thus, comparisons between queries and the social graph may be based on criteria such as derived or inferred characteristics, geographic distance, or based on having a common concept (or some other relationship) in a concept graph.

Once person results 122 have been provided to search engine 106, a full set of results 124 may be provided to user 102. The results that are provided may include both objective results 126 (of which document results 110 are one example), and may also include person results 122. The person results may be provided along with an explanation of the person's relevance to the query. For example, if "Joe" is one of the person results provided in response to the query "restaurant in Berkeley", then a comment such as "lived in Berkeley" might be provided along with Joe's name. The person results that are provided to user 102 may be actionable, such that user 102's activating a person results initiates contact with the person identified in the result—e.g., by e-mail, by IM, by text message, or by any other appropriate communication mechanism.

Figure 2:
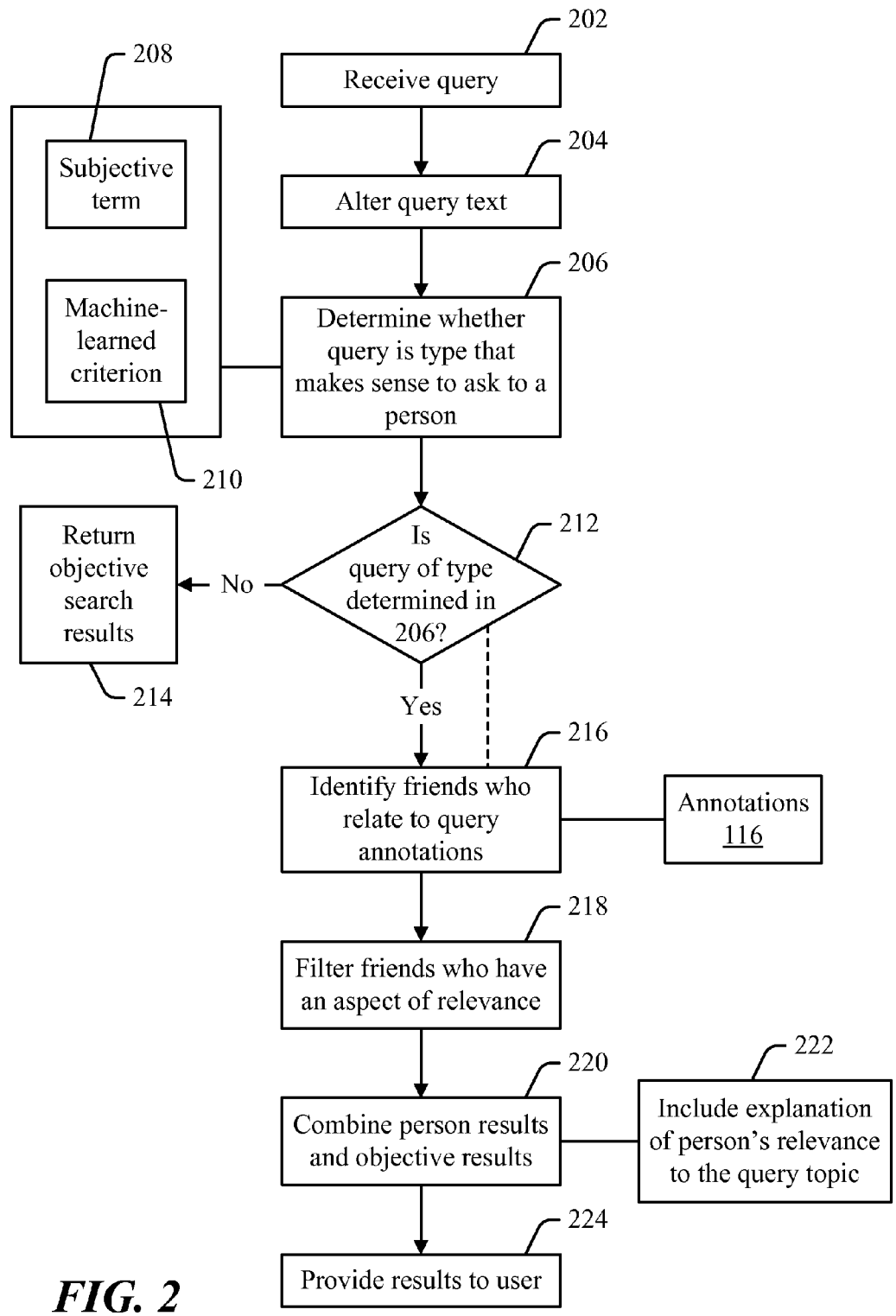
FIG. 2 is a flow diagram of an example process in which a search query may be responded to with objective results and person results.

FIG. 2 shows an example process in which a search query may be responded to with objective results and person results. Before turning to a description of FIG. 2, it is noted that the flow diagram in FIG. 2 is described, by way of example, with reference to components shown in FIG. 1, although the process of FIG. 2 may be carried out in any system and is not limited to the scenario shown in FIG. 1. Additionally, the flow diagram in FIG. 2 shows an example in which stages of a process are carried out in a particular order, as indicated by the lines connecting the blocks, but the various stages shown in this diagram can be performed in any order, or in any combination or sub-combination.

At 202, a query may be received. For example, a query may be entered by a user into a search engine's search box, into a search toolbar's search box, or into the navigation bar of a browser. Such a query may be received by a search engine at 202. At 204, the query text may be modified or altered in some manner—e.g., by expanding terms with synonyms, or with other words having the same stem. The original or altered query may be provided to a search engine.

At 206, it is determined based on some criterion or criteria (e.g., by the search engine) whether the query is of a type that makes sense to ask to a person. There are various criteria that can be used to make this determination. In one example, it is determined whether the query contains a subjective term (block 208). For example, a query that asks for a "good" airline, or a "tasty" food, or "fun" places to go might be interpreted as asking for subjective information that can be asked to a person. In another example, machine learning is used (block 210) to train a classifier to identify the types of queries that users tend to want to ask to their friends. The process of training a classifier to identify these types of queries is described above.

If the query is not of a type that it makes sense to pose to a person (as determined at 212), then the search engine that received the query may return objective search results to the user who entered the query (block 214). But if the query is of the type that can be posed to a person, then the process continues to 216 to identify friends who relate to the query. This determination may be made based on the social graph discussed above in connection with FIG. 1, and also based on the annotations 116 associated with specific people in the graph. Continuing with the earlier example, if the query is for "restaurant in Berkeley," the determination of whom to identify may be made by finding people in the social graph who (a) are friends with the user who entered the query, and (b) have some connection to Berkeley.

In one example, the decision to include people among the query results may be made based solely on the query. But in another example, the decision to include people in the query results may be made conditionally, contingent upon the user's having a sufficient number of friends who would be helpful in answering the query. For example, "restaurant in Berkeley" might appear to be a query that could be posed to people, but the user might not have any friends with any connection to Berkeley. Therefore, after preliminarily deciding to include people among the results, a search engine might determine not to do so depending upon whether there are any people with a sufficient connection to the user and to the query. For this reason, FIG. 2 shows a dotted line connecting 212 and 216, which indicates that the decision to include people in the results may—but does not necessarily—precede the identification of people to include in the results. Rather, the identification of people may occur first, and may inform the decision as to whether to include people in the results.

At 218, a filter may be applied in order to eliminate those friends who do not have some minimum aspect of relevance to the query. For example, the friends who are identified at 216 may be scored based on factors such as how close their relationship is to the user who entered the query, and/or how relevant the friend's background is to the query. (The concept of how close two people in the social graph are may be generalized by the phrase "meeting a closeness condition." I.e., a "closeness condition" might specify how far apart two people's vertices in the social graph can be while still allowing one person to appear in the search results of another person.) At 218, friends whose scores meet some minimum threshold may be selected for inclusion in the final results. At 220, the person results may be combined with the objective results, in order to produce a final set of results. As to the person results, in one example each of the person results may include an accompanying explanation of the person's relevance to the query topic (at 222). Continuing with the earlier example of the query "restaurant in Berkeley", such an explanation might say "lived in Berkeley", "attended the University of California at Berkeley", etc. As explained above, comparisons between the query and people in the social graph may be made based on simple comparison of words in the query to annotations in the graph, but may also be made based on criteria such as derived or inferred characteristics, geographic distance, or based on having a common concept (or some other relationship) in a concept graph.

At 224, the final results—including the objective results and the person results (if applicable)—may be provided to the user.

Figure 3:
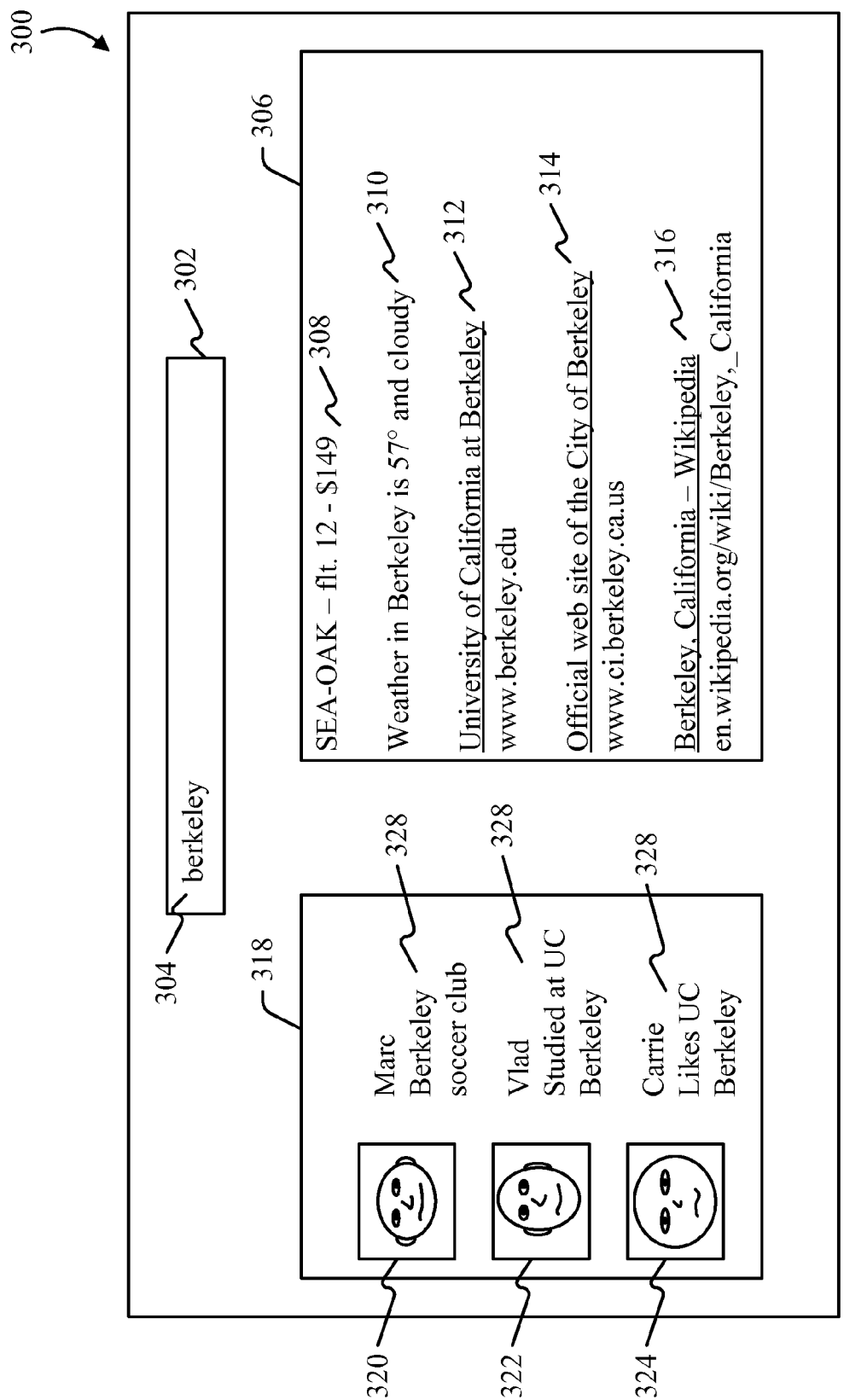
FIG. 3 shows an example user interface of a search engine that provides both objective results and person results.

FIG. 3 shows an example user interface of a search engine that provides both objective results and person results. The user interface shown in FIG. 3 may, for example, be displayed by a browser on a personal computer. However, such a user interface could be displayed in other scenarios or context, such as in a search application on a wireless telephone.

User interface 300 contains search box 302, into which a query 304 has been entered. In this example, the query is simply the word "Berkeley". Because there are various things that the user might be looking for when entering the single word "Berkeley", a search engine may determine to provide both objective results and person results in response to the query.

Thus, the search engine in this example (whose results are displayed in user interface 300) provides a plurality of objective results 306. On example result 308 is a specific flight to an airport near Berkeley. (Specifically, in this example the search engine may have detected that the query was being issued from the Seattle area, so it finds a flight from Seattle-Tacoma International Airport (SEA) to Oakland International Airport (OAK), since OAK is near Berkeley.) A specific flight is an example of an objective result, since this type of result can be gleaned from flight databases. Another example of an objective result 310 is the current weather in Berkeley. Other examples of objective results 312, 314, and 316 are specific web documents relating to Berkeley—e.g., the web site of the University of California at Berkeley, the web site of the City of Berkeley, and the Wikipedia page on the City of Berkeley.

Other results that are provided in this example are person results 318. Such results may be shown separately from the objective results 306; in this example, the person results 318 are shown in a separate box within user interface 300, and are labeled "related friends". Person results 318 identify three specific people, who—in some social graph—may be considered "friends" of the user who entered query 304. In this example, the three person results 320, 322, and 324 include "Marc", "Vlad", and "Carrie". Each person may be identified by a picture, and also may be identified by an explanation 328 of the person's relevance to query 304. Thus, Marc's relevance is explained with the phrase "Berkeley soccer club", Vlad's relevance is explained with the phrase "Studied at UC Berkeley", and Carrie's relevance is explained by the phrase "Likes UC Berkeley." Other examples of explanations of relevance may include: "Has recently tweeted about Berkeley"; "Has recently expressed interest in an ad for UC Berkeley"; "Has recently posted on his/her wall about Berkeley". Any appropriate explanation of a person's relevance could be given.

Each of the person results 318 may be clickable or otherwise actionable, in order to allow a user to initiate a conversation with one of the results. For example, clicking on result 320 may initiate a conversation with "Marc"—e.g., by e-mail, by telephone, by text message, by instant message, or by any other appropriate communication mechanism.

Figure 4:
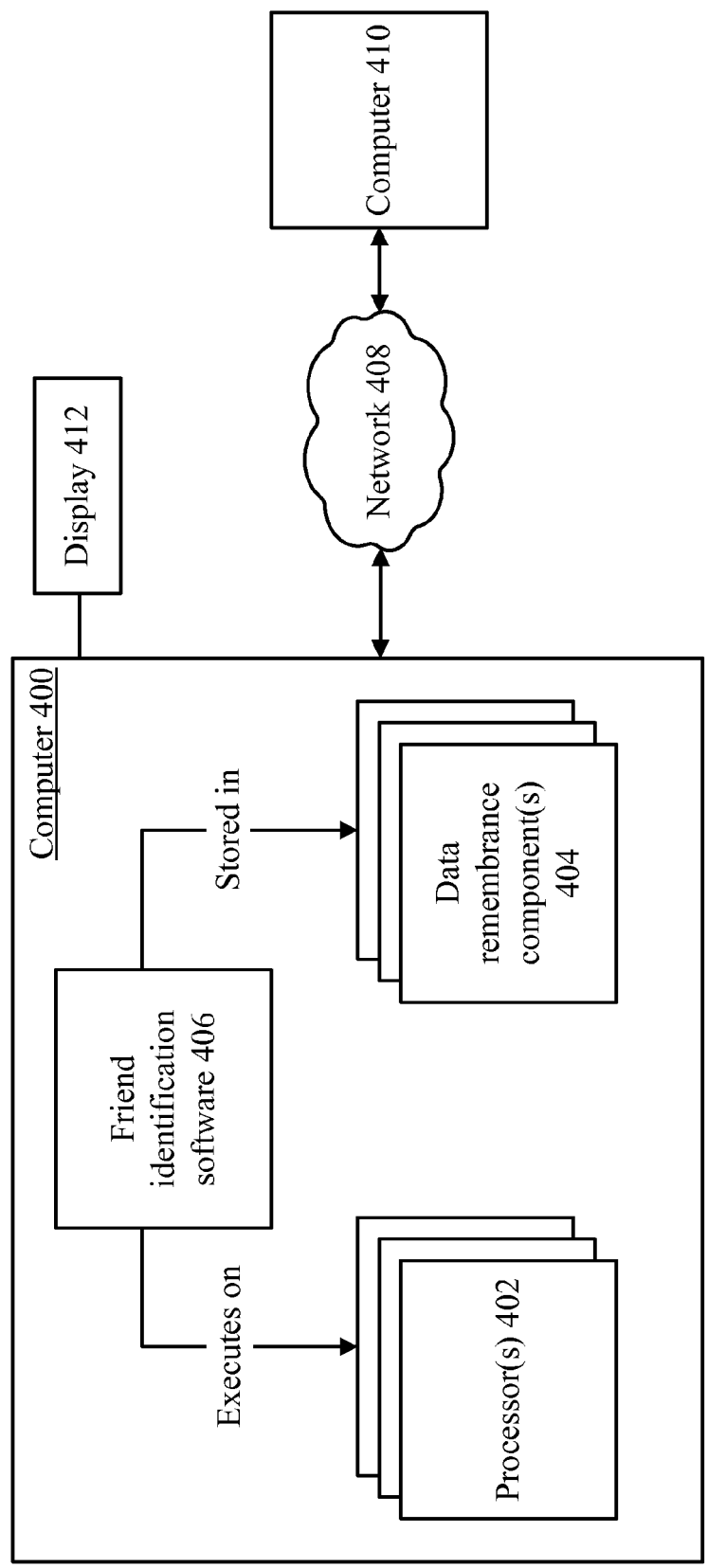
FIG. 4 is a block diagram of example components that may be used in connection with implementations of the subject matter described herein.

FIG. 4 shows an example environment in which aspects of the subject matter described herein may be deployed.

Computer 400 includes one or more processors 402 and one or more data remembrance components 404. Processor(s) 402 are typically microprocessors, such as those found in a personal desktop or laptop computer, a server, a handheld computer, or another kind of computing device. Data remembrance component(s) 404 are components that are capable of storing data for either the short or long term. Examples of data remembrance component(s) 404 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 400 may comprise, or be associated with, display 412, which may be a cathode ray tube (CRT) monitor, a liquid crystal display (LCD) monitor, or any other type of monitor.

Software may be stored in the data remembrance component(s) 404, and may execute on the one or more processor(s) 402. An example of such software is friend identification software 406, which may implement some or all of the functionality described above in connection with FIGS. 1-3, although any type of software could be used. Software 406 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 4, although the subject matter described herein is not limited to this example.

The subject matter described herein can be implemented as software that is stored in one or more of the data remembrance component(s) 404 and that executes on one or more of the processor(s) 402. As another example, the subject matter can be implemented as instructions that are stored on one or more computer-readable storage media. Tangible media, such as optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium. It is noted that there is a distinction between media on which signals are "stored" (which may be referred to as "storage media"), and—in contradistinction—media that transmit propagating signals. DVDs, flash memory, magnetic disks, etc., are examples of storage media. On the other hand, wires or fibers on which signals exist ephemerally are examples of transitory signal media.

Additionally, any acts described herein (whether or not shown in a diagram) may be performed by a processor (e.g., one or more of processors 402) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 400 may be communicatively connected to one or more other devices through network 408. Computer 410, which may be similar in structure to computer 400, is an example of a device that can be connected to computer 400, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage devices that store executable instructions to provide search results, the executable instructions, when executed by a computer, causing the computer to perform acts comprising:
    receiving a query from a user;
    determining that the query is one to be asked to a person in addition to, or instead of, a search engine;
    comparing said query to a corpus of information to obtain objective results;
    comparing said query to a social graph to identify one or more people whose relationship to said user meets a closeness condition and who have an aspect of relevance to said query;
    creating person results that comprise said one or more people and, for each of said one or more people, an explanation of each person's relevance to said query, said social graph indicating attributes for people in said social graph, said explanation of a given person's relevance comprising an attribute that is indicated in said social graph for said given person, said attribute matching a term in said query; and
    providing, to said user, a set of results that comprise said objective results and said person results.

2. The one or more computer-readable storage devices of claim 1, said aspect of relevance being based on a comparison of words in said query with attributes of people in said social graph.

3. The one or more computer-readable storage devices of claim 1, said aspect of relevance being based on a comparison of words in said query with things or concepts for which people in said social graph have declared affinity.

4. The one or more computer-readable storage devices of claim 1, said query indicating a first geographic location, said aspect of relevance being based on a comparison of said first geographic locations with geographic locations of people in said social graph, said query being found to match a person who is associated with a second geographic location different from said first geographic location based on distance between said first geographic location and said second geographic location.

5. The one or more computer-readable storage devices of claim 1, said aspect of relevance being based on a comparison of words in said query with a characteristic that is derived from likes or text posts of a person in said social graph, said query being found to match said person based on words in said query matching said characteristic.

6. The one or more computer-readable storage devices of claim 1, said aspect of relevance being based on a determination that words in said query and an annotation of a person in said social graph are both associated with a concept in a concept graph.

7. The one or more computer-readable storage devices of claim 1, said determining that said query is answerable with subjective or socially-derived information being performed after a comparison of said query to said social graph, said determining being based on whether there are a sufficient number of people in said social graph who meet said closeness condition and have said aspect of relevance.

8. A method of providing search results, the method comprising:
using a processor to perform acts, said acts being implemented by instructions that are stored in a memory, said acts comprising:
receiving a query from a user;
determining that the query is one to be asked to a person in addition to, or instead of, a search engine;
obtaining objective results from a corpus of information;
using a social graph to identify one or more people who are friends of said user in said social graph, and who have an aspect of relevance to said query;
creating person results that comprise said one or more people and, for each of said one or more people, an explanation of each person's relevance to said query, said social graph indicating attributes for people in said social graph, said explanation of a given person's relevance comprising an attribute that is indicated in said social graph for said given person; and
providing, to said user, a set of results that comprise said objective results and said person results, each of said person results being actionable to initiate contact between said user and a person identified in a given result.

9. The method of claim 8, said aspect of relevance being based on a comparison of words in said query with wall posts or tweets of people in said social graph.

10. The method of claim 8, said aspect of relevance being based on a comparison of words in said query with Uniform Resource Locators that people in said social graph have entered.

11. The method of claim 8, said query indicating a first geographic location, said aspect of relevance being based on a comparison of said first geographic locations with geographic locations of people in said social graph, said query being found to match a person who is associated with a second geographic location different from said first geographic location based on distance between said first geographic location and said second geographic location.

12. The method of claim 8, said determining that said query is answerable with subjective information being performed after a comparison of said query to said social graph, said determining being based on whether there are a sufficient number of people in said social graph who are friends with said user and who have said aspect of relevance.

13. The method of claim 8, said determining that said query is answerable with subjective information being based said query's containing specific words that have been determined to be associated with subjective requests.

14. A system for providing search results, the system comprising:
a memory;
a processor; and
a component that is stored in said memory, that executes on said processor, that receives a query from a user, that determines that said query is one to be asked to a person in addition to, or instead of, a search engine, that obtains objective results corresponding to the query from a corpus of information, that identifies one or more people in a social graph whose relationship to said user meets a closeness condition and who have an aspect of relevance to said query, that creates person results that comprise a portion of said one or more people, that creates, for each of said one or more people, an explanation of each person's relevance to said query, and that provides, to said user, a set of results that comprise said objective results and said person results.

15. The system of claim 14, said aspect of relevance being based on a comparison of words in said query with attributes of people in said social graph.

16. The system of claim 14, said aspect of relevance being based on a comparison of words in said query with ads that people in said social graph have clicked-through.

17. The system of claim 14, said aspect of relevance being based on a comparison of words in said query with a characteristic that is derived from declared affinities or text posts of a person in said social graph, said query being found to match said person based on words in said query matching said characteristic.

18. The system of claim 14, said aspect of relevance being based on a determination that words in said query and an annotation of a person in said social graph are both associated with a concept in a concept graph.

19. The system of claim 14, wherein said component determines that said query is answerable, in part, with subjective information after said component compares said query to said social graph, and wherein said component determines that said query is answerable, in part, with subjective information based on whether there are a sufficient number of people in said social graph who meet said closeness condition and have said aspect of relevance.

20. The system of claim 14, wherein said component determines that said query is answerable, in part, with subjective information based on whether specific words appear in said query.

* * * * *